(12) United States Patent
Ramamoorthi et al.

(10) Patent No.: US 10,489,255 B2
(45) Date of Patent: Nov. 26, 2019

(54) DISASTER RECOVERY OF CONTAINERS

(71) Applicant: HEWLETT PACKARD ENTERPRISE DEVELOPMENT LP, Houston, TX (US)

(72) Inventors: Balaji Ramamoorthi, Bangalore (IN); Siva Subramaniam Manickam, Bangalore (IN); Vinnarasu Ganesan, Bangalore (IN); Thavamaniraja Sakthivel, Bangalore (IN); Saravana Prabu, Bangalore (IN)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 108 days.

(21) Appl. No.: 15/847,261

(22) Filed: Dec. 19, 2017

(65) Prior Publication Data

US 2019/0188094 A1 Jun. 20, 2019

(51) Int. Cl.
*G06F 11/00* (2006.01)
*G06F 11/20* (2006.01)
*G06F 11/16* (2006.01)

(52) U.S. Cl.
CPC ........ *G06F 11/203* (2013.01); *G06F 11/1662* (2013.01); *G06F 11/2023* (2013.01); *G06F 2201/805* (2013.01); *G06F 2201/82* (2013.01)

(58) Field of Classification Search
CPC .. G06F 11/1142; G06F 11/1425; G06F 11/16; G06F 11/20; G06F 11/2005; G06F 11/2007; G06F 11/202; G06F 11/2023

USPC .................................................. 714/4.12, 4.1
See application file for complete search history.

(56) References Cited

U.S. PATENT DOCUMENTS

| | | | |
|---|---|---|---|
| 8,239,863 B2 | 8/2012 | Bhat et al. | |
| 8,539,087 B2 | 9/2013 | Gawali et al. | |
| 8,930,747 B2 | 1/2015 | Levijarvi et al. | |
| 9,253,159 B2 | 2/2016 | Chauhan et al. | |
| 9,298,491 B2 | 3/2016 | Chan et al. | |
| 9,674,108 B1* | 6/2017 | Ryan | H04L 47/70 |
| 9,705,965 B2 | 7/2017 | Zhang et al. | |
| 2011/0307736 A1 | 12/2011 | George et al. | |

(Continued)

OTHER PUBLICATIONS

Commvault Systems, Inc., "Using Live Sync to Support Disaster Recovery for VMware Virtual Machines," Dec. 13, 2016, pp. 1-26, Version 11, Service Pack 6.

(Continued)

*Primary Examiner* — Sarai E Butler
(74) *Attorney, Agent, or Firm* — Hewlett Packard Enterprise Patent Department

(57) ABSTRACT

In one example, mapping information corresponding to a container running on a private data center may be generated in a public cloud by a processor-based disaster recovery manager. Further, volume data associated with the container may be synchronized to the public cloud based on the mapping information by the disaster recovery manager. Furthermore, a failure of the container running on the private data center may be determined by the disaster recovery manager. In response to the failure of the container running on the private data center, the container may be deployed in the public cloud using the synchronized volume data and the mapping information by the disaster recovery manager.

20 Claims, 8 Drawing Sheets

(56) References Cited

U.S. PATENT DOCUMENTS

| | | | |
|---|---|---|---|
| 2014/0108665 A1 | 4/2014 | Arora et al. | |
| 2014/0281700 A1* | 9/2014 | Nagesharao | G06F 11/1415 714/15 |
| 2014/0366155 A1 | 12/2014 | Chang et al. | |
| 2016/0292053 A1* | 10/2016 | Antony | G06F 11/203 |
| 2017/0060975 A1 | 3/2017 | Akyureklier et al. | |
| 2017/0185488 A1 | 6/2017 | Kumarasamy et al. | |
| 2017/0214550 A1 | 7/2017 | Kumar et al. | |
| 2017/0244787 A1 | 8/2017 | Rangasamy et al. | |
| 2018/0034821 A1* | 2/2018 | Basetty | G06F 9/45558 |

OTHER PUBLICATIONS

Zerto, "Zerto Cloud Continuity Platform", available online at <https://web.archive.org/web/20170527045934/http://www.zerto.com:80/products/disaster-recovery-to-the-cloud/zerto-cloud-continuity-platform/>, May 27, 2017, 3 pages.

Zerto, "Hybrid Cloud: Cloud Mobility", available online at <https://www.zerto.com/solutions/infrastructure/hybrid-cloud-dr-replication-offsite-backup-migrations/>, Copyright 2010-2019, 4 pages.

Panchal, "Hybrid Cloud Scenarios: Disaster Recovery", available online at <https://blog.equinix.com/blog/2015/02/02/hybrid-cloud-scenarios-disaster-recovery/> ,Feb. 2, 2015, pp. 1-3.

Pahl et al., "Containers and Clusters for Edge Cloud Architectures—A Technology Review", 3rd International Conference on Future Internet of Things and Cloud, IEEE, 2015, 8 pages.

European Search Report and Search Opinion Received for EP Application No. 18206792.6, dated May 31, 2019, 8 pages.

Docker Documentation, "Backups and Disaster Recovery", available online at <https://web.archive.org/web/20170705103753/https://docs.docker.com/datacenter/ucp/2.1/guides/admin/backups-and-disaster-recovery/>, Jul. 5, 2017, 4 pages.

* cited by examiner

US 10,489,255 B2

DISASTER RECOVERY OF CONTAINERS

BACKGROUND

The explosion of cloud computing domain has accelerated the growth in cloud service models, such as Infrastructure as a service (IaaS), Platform as a service (PaaS), Software as a service (SaaS), and the like. Cloud computing environments can be implemented to provide storage services to meet ever-growing data storage demands. Cloud storage may provide storage hosted by a third-party service provider, where storage can be purchased for use on an as-needed basis. This may allow for expanding storage capacity without incurring costs associated with adding dedicated storage. Further, commercial storage clouds have demonstrated feasibility of cloud storage services, offering significant storage at significantly low prices yet with high availability.

BRIEF DESCRIPTION OF THE DRAWINGS

Certain examples are described in the following detailed description and in reference to the drawings, in which.

DETAILED DESCRIPTION

Mission critical containerized applications of an enterprise may need disaster recovery mechanisms to recover seamlessly. In a hybrid cloud deployment, the enterprise/customer may tend to run the sensitive mission critical containerized applications, herein after referred to as containers, in a private data center that is managed by the enterprise. Further, the enterprise may use another dedicated data center for disaster recovery operations for such mission critical applications. Some disaster recovery solutions may involve replication using an asymmetric 'active/active' setup in which components at both the private data center and dedicated data center sites are active. An example may include first and second containers that are active and online in the disaster recovery environment with at least a portion of computing resources of the replication private data center being replicated to the replication dedicated data center. However, the use of computing resources on the dedicated data center for replicating containers may involve significant operational and maintenance cost.

Further, cloud storage (e.g., a public cloud) may provide storage hosted by a third-party service provider, where storage can be purchased for use on an as-needed basis. This may allow for expanding storage capacity without incurring costs associated with adding dedicated storage. With an increasing trend in migrating data centers to cloud platforms, there is an increasing demand for a hybrid cloud model of maintaining a primary on-premise data center and using a public cloud platform as a standby for backup and disaster recovery purposes.

Examples described herein may provide disaster recovery of containers running in a private cloud. In one example, a processor-based disaster recovery manager may generate mapping information, in a public cloud, corresponding to a container running on the private cloud. Further, the disaster recovery manager may synchronize volume data associated with the container to the public cloud based on the mapping information. Furthermore, the disaster recovery manager may determine a failure of the container running on the private data center and deploy the container in the public cloud using the synchronized volume data and the mapping information.

Examples described herein may provide disaster recovery of the container running in the private cloud in a cost-effective way, by backing up the volume data for selected instances, restoring the container in the public cloud when disaster happens, and revert the container to the private cloud when the private cloud comes online. Thus, examples described herein may reduce the cost for having a dedicated disaster recovery solution and enable to pay for the public cloud services that may be utilized during the disaster period.

Figure 1:
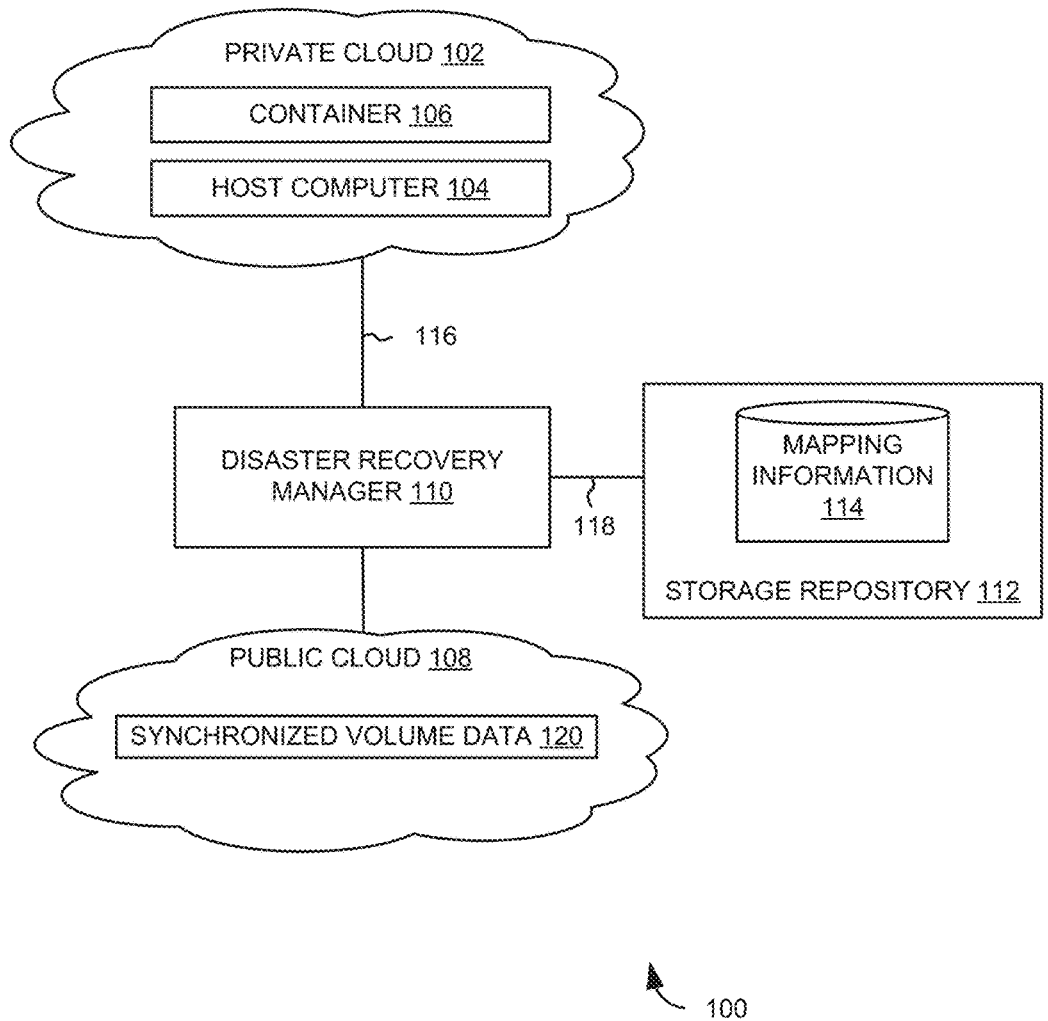
FIG. 1 is a block diagram of an example system for performing disaster recovery operations.

FIG. 1 is a block diagram of an example system 100 for performing disaster recovery operations. Example system 100 may include a first interface 118, a second interface 116, and a disaster recovery manager 110. During operation, disaster recovery manager 110 may store mapping information 114 corresponding to a container 106 in a storage repository 112 via first interface 118. Container 106 may run on a host computer 104 in a private cloud 102. The terms "host computer" and "container host" may be used interchangeably throughout the document.

The term "containers" may refer to software instances that enable virtualization at an operating system level. That is, with containerization, the kernel of the operating system that manages host computer 104 can provide multiple isolated user space instances. These instances, referred to as containers, appear as unique servers from the standpoint of an end user that communicates with the containers. However, from the standpoint of the operating system that manages host computer 104 on which the containers execute, the containers may be user processes that are scheduled and dispatched by the operating system. In other examples, containers may be executed on a virtual machine.

Further during operation, disaster recovery manager 110 may synchronize volume data associated with container 106 to a public cloud 108 based on mapping information 114 via second interface 116. Further, disaster recovery manager 110 may determine a failure of container 106 running on private cloud 102. For example, the failure of container 106 may be caused due to a disaster at host computer 104 or private cloud 102. Furthermore, disaster recovery manager 110 may initiate a disaster recovery operation to deploy container 106 in public cloud 108 using synchronized volume data 120 and mapping information 114 in response to determining the failure of container 106.

For example, disaster recovery manager 110 may be any combination of hardware and programming to implement the functionalities described herein. In some implementations, the programming may be processor executable instructions stored on a non-transitory machine-readable storage medium, and the hardware may include at least one processing resource to retrieve and/or execute those instructions. In some implementations, the hardware and programming may be that of the private cloud 102 or the public cloud 108. Example processing resources include a microcontroller, a microprocessor, central processing unit core(s), an application-specific integrated circuit (ASIC), a field programmable gate array (FPGA), etc. Example non-transitory machine-readable medium include random access memory (RAM), read-only memory (ROM), electrically erasable programmable read-only memory (EEPROM), flash memory, a hard disk drive, etc. The term "non-transitory" does not encompass transitory propagating signals. Additionally or alternatively, disaster recovery manager 110 may include electronic circuitry or logic for implementing functionality described herein. Example disaster recovery operation is explained in detail in FIGS. 2A and 2B.

Figure 2A:
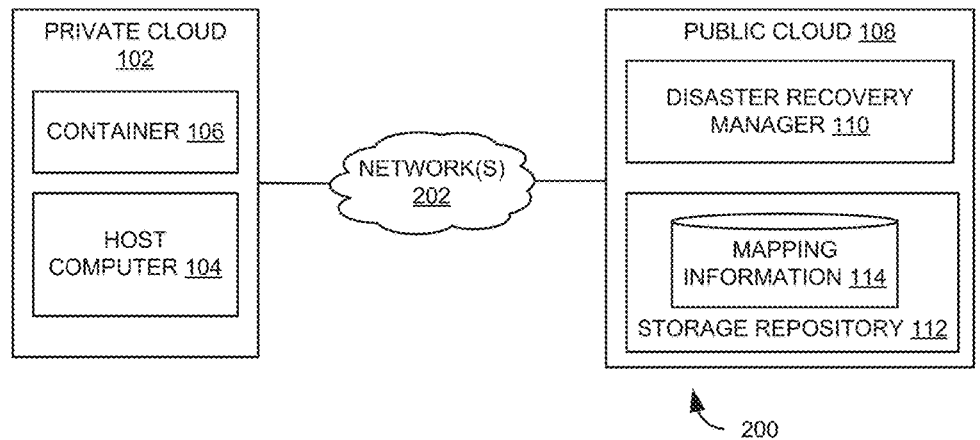
FIG. 2A is a block diagram of another example system, depicting disaster recovery operations of a hybrid cloud computing system.
Figure 2B:
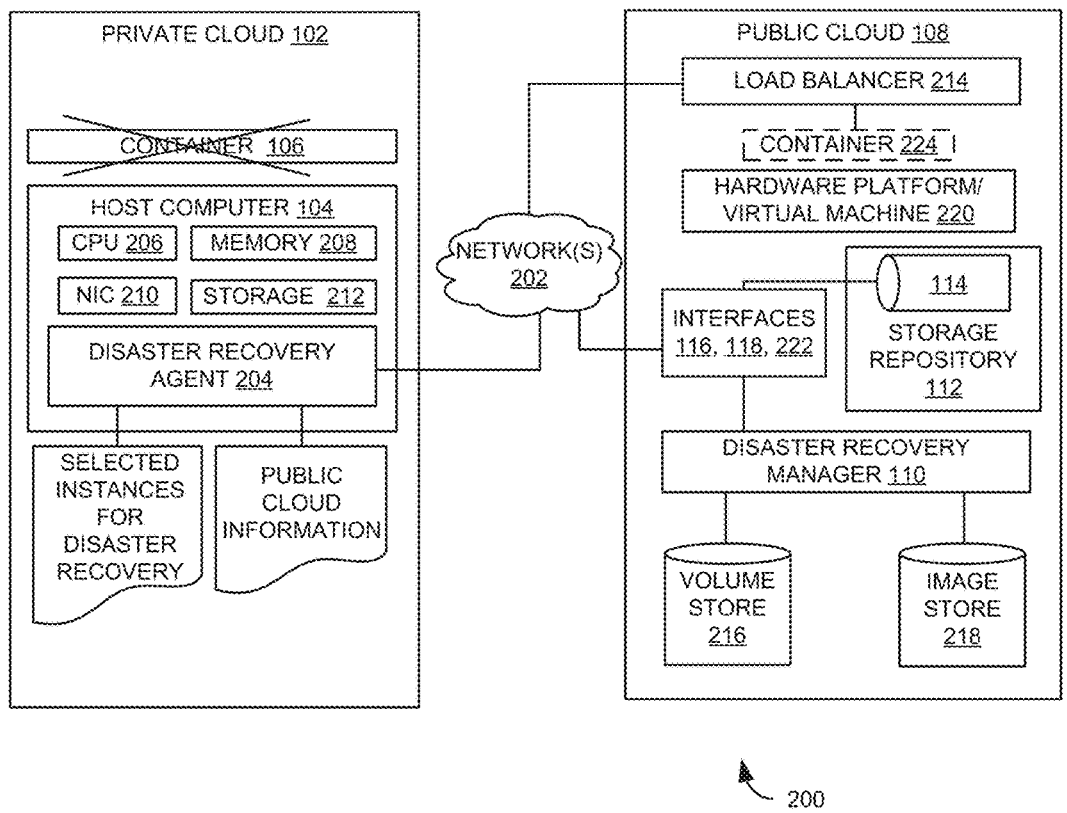
FIG. 2B is a block diagram of the example system of FIG. 2A, depicting additional features.

FIG. 2A is a block diagram of another example system 200, depicting disaster recovery operations of a hybrid cloud computing system. FIG. 2B is a block diagram of example system 200 of FIG. 2A, depicting additional features. As shown in FIG. 2A, system 200 may include private cloud 102 and public cloud 108 that are in communication with each other over network(s) 202.

Network 202 be any type and/or form of network and may include any of the following: a point to point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network, and a wireline network. In some embodiments, network 104 may comprise a wireless link, such as an infrared channel or satellite band.

The term "cloud" may be a collection of hardware and machine-readable instructions ("cloud infrastructure") forming a shared pool of configurable network resources (e.g., networks, servers, storage, applications, services, and the like) that can be suitably provisioned to provide on-demand self-service, network access, resource pooling, elasticity, and measured service, among other features. Cloud can be deployed as a private cloud, a public cloud, or a suitable combination thereof.

Further, private cloud 102 may include at least one data center that can be controlled and administrated by an enterprise or business organization. Private cloud 102 may include multiple servers/host computers, with each server hosting at least one virtual machine and/or container. Users can access the virtual machine and/or container in a location transparent manner. The terms "private cloud" and "private data center" are used interchangeably throughout the document. Furthermore, public cloud 108 may be operated by a cloud service provider and exposed as a service available to account holders, such as the enterprise or the business organization. For example, the enterprise can sign up to use a fixed amount of processing resource, storage, and network services provided by public cloud 108. In other examples, any other data center or cloud can be used instead of public cloud 108 to implement the disaster recovery operations.

As shown in FIG. 2A, container 106 may run on host computer 104 in private cloud 102. In the example shown in FIG. 2A, disaster recovery manager 110 can be implemented as a part of public cloud 108. In other examples, disaster recovery manager 110 can run on a hardware platform or virtual machine that can be externally connected to private cloud 102 and public cloud 108.

As shown in FIG. 2B, system 200 may include a third interface 222 in public cloud 108 to create a disaster recovery group in public cloud 108 and assign container 106 running on private cloud 102 to the disaster recovery group. In some examples, third interface 222 and disaster recovery manager 110 can run as virtual machines in public cloud 108. Interface 222 may provide a user interface (UI) and/or command-line interface (CLI) to enable users to create the disaster recovery groups, add containers to the disaster recovery groups, and manage the recovery process via disaster recovery agent 204 running on private cloud 102. For example, mapping information 114 for container 106 may be maintained, in public cloud 108, corresponding to the disaster recovery group. Furthermore, information associated with public cloud 108 may be stored in private cloud 102.

During operation, disaster recovery manager 110 may store mapping information 114 corresponding to container 106 in storage repository 112. For example, mapping information 114 may include at least one of information associated with a container image, a location (e.g., IP address) of the container image in public cloud 108, a location of the volume data in public cloud 108, and a location of the volume data in private cloud 102. In other examples, mapping information 114 may be created for each container under the disaster recovery group.

Further, disaster recovery manager 110 may synchronize the volume data associated with container 106 to public cloud 108 based on mapping information 114. In one example, disaster recovery agent 204 may run on private cloud 102 to back-up the data and synchronize with public cloud 108 via disaster recovery manager 110. For example, disaster recovery manager 110 may back up the volume data for selected instances or at time intervals. In one example, disaster recovery manager 110 may receive and store the container image associated with container 106 to an image store 218 in public cloud 108 based on mapping information 114. Image store 218 may be used to save the container images downloaded from private cloud 102, which can be used for container deployment during disaster recovery process. The container image may represent a compressed collection of reference files and folders that may be needed to successfully install and configure a container on a computing device. Disaster recovery agent 204 may copy the container image once to image store 218 based on mapping information 114.

Further, disaster recovery manager 110 may receive and store the volume data associated with container 106 to a volume store 216 in public cloud 108 based on mapping information 114. Furthermore, disaster recovery manager 110 may dynamically update changes in the volume data associated with container 106 to volume store 216. Volume store 216 may refer to a location in public cloud 108 to store the backed-up volume data for container 106 under the disaster recovery group. Synchronizing the volume data associated with container 106 may be explained in detail in FIG. 3.

Furthermore, disaster recovery manager 110 may determine a failure of container 106 running on private cloud 102. In one example, disaster recovery manager 110 may determine the failure of container 106 running on private cloud 102 by detecting a heartbeat loss from disaster recovery agent 204 residing in host computer 104. In one example, as depicted in FIG. 2B, host computer 104 may include compute, network, and storage resources such as central processing unit (CPU) 206, memory 208, network interface card (NIC) 210, and storage 212. An instance of disaster recovery agent 204 may run on each virtual machine/bare metal host (i.e., host computer 104) that is hosting container 106 in private cloud 102.

Memory 208 may include a volatile or non-volatile memory, such as dynamic random-access memory (DRAM) or an extremely fast non-volatile memory, such as resistive ram (ReRAM), memristor memory, or the like. Example CPU 206 may include an application-specific integrated circuit (ASIC), field programmable gate array (FPGA), or the like, or some combination thereof. Storage 212 may include a logical or physical storage device, such as a storage area network (SAN), storage array, hard drive, solid state drive, and the like, or some combination thereof. NIC 210 may be a computer hardware component that connects host computer 104 to network 202.

In one example, disaster recovery manager 110 may initiate a disaster recovery operation to deploy container 224 in public cloud 108 using the synchronized volume data and mapping information 114 in response to determining the failure of container 106 (e.g., as shown by an "X" through container 106 in FIG. 2B). In one example, disaster recovery manager 110 may retrieve the container image associated with container 106 from image store 218 in public cloud 108 based on mapping information 114 upon detecting the failure. Further, disaster recovery manager 110 may retrieve the volume data associated with container 106 from volume store 216 in public cloud 108 based on mapping information 114. Furthermore, disaster recovery manager 110 may deploy container 224 on a hardware platform 220 or a virtual machine running on hardware platform 220 in public cloud 108 using the retrieved container image and the retrieved volume data.

In one example, as shown in FIG. 2B, container 224 may be deployed on hardware platform/virtual machine 220 in public cloud 108 as follows:

1. Retrieve mapping information 114 from storage repository 112.
2. Create a raw block storage volume and mount the raw block storage volume to hardware platform/virtual machine 220 in public cloud 108.
3. Retrieve the volume data associated with container 106 from volume store 216 based on mapping information 114 and store the retrieved volume data to the mounted raw block storage volume.
4. Deploy container 224 on hardware platform/virtual machine 220 in public cloud 108 using the retrieved container image and the retrieved volume data in the mounted raw block storage volume.

Further, disaster recovery manager 110 may call an external load balancer 214 in public cloud 108 (e.g., as in FIG. 2B) to create a network routing entry to direct traffic to container 224 deployed in public cloud 108. Example load balancer 214 may be a gateway that routes traffic incoming to and outgoing from container 224 and provide networking services, such as firewalls, network address translation (NAT), dynamic host configuration protocol (DHCP), and load balancing. In some examples, external load balancer 214 can be implemented as part of private cloud 102, public cloud 108, or external to both private cloud 102 and public cloud 108. In other examples, each of private cloud 102 and public cloud 108 can have a respective load balancer to implement the functionalities described herein. Further, disaster recovery manager 110 may update mapping information 114 corresponding to container 224 upon redirecting the traffic to container 224 deployed in public cloud 108.

For example, disaster recovery manager 110 and disaster recovery agent 204 may each be any combination of hardware and programming to implement the functionalities described herein. In some implementations, the programming may be processor executable instructions stored on a non-transitory machine-readable storage medium, and the hardware may include at least one processing resource to retrieve and/or execute those instructions. In some implementations, the hardware and programming may be that of the private cloud 102 or the public cloud 108. Example processing resources include a microcontroller, a microprocessor, central processing unit core(s), an application-specific integrated circuit (ASIC), a field programmable gate array (FPGA), etc. Example non-transitory machine-readable medium include random access memory (RAM), read-only memory (ROM), electrically erasable programmable read-only memory (EEPROM), flash memory, a hard disk drive, etc. The term "non-transitory" does not encompass transitory propagating signals. Additionally or alternatively, disaster recovery manager 110 and disaster recovery agent 204 may each include electronic circuitry or logic for implementing functionality described herein.

Figure 3:
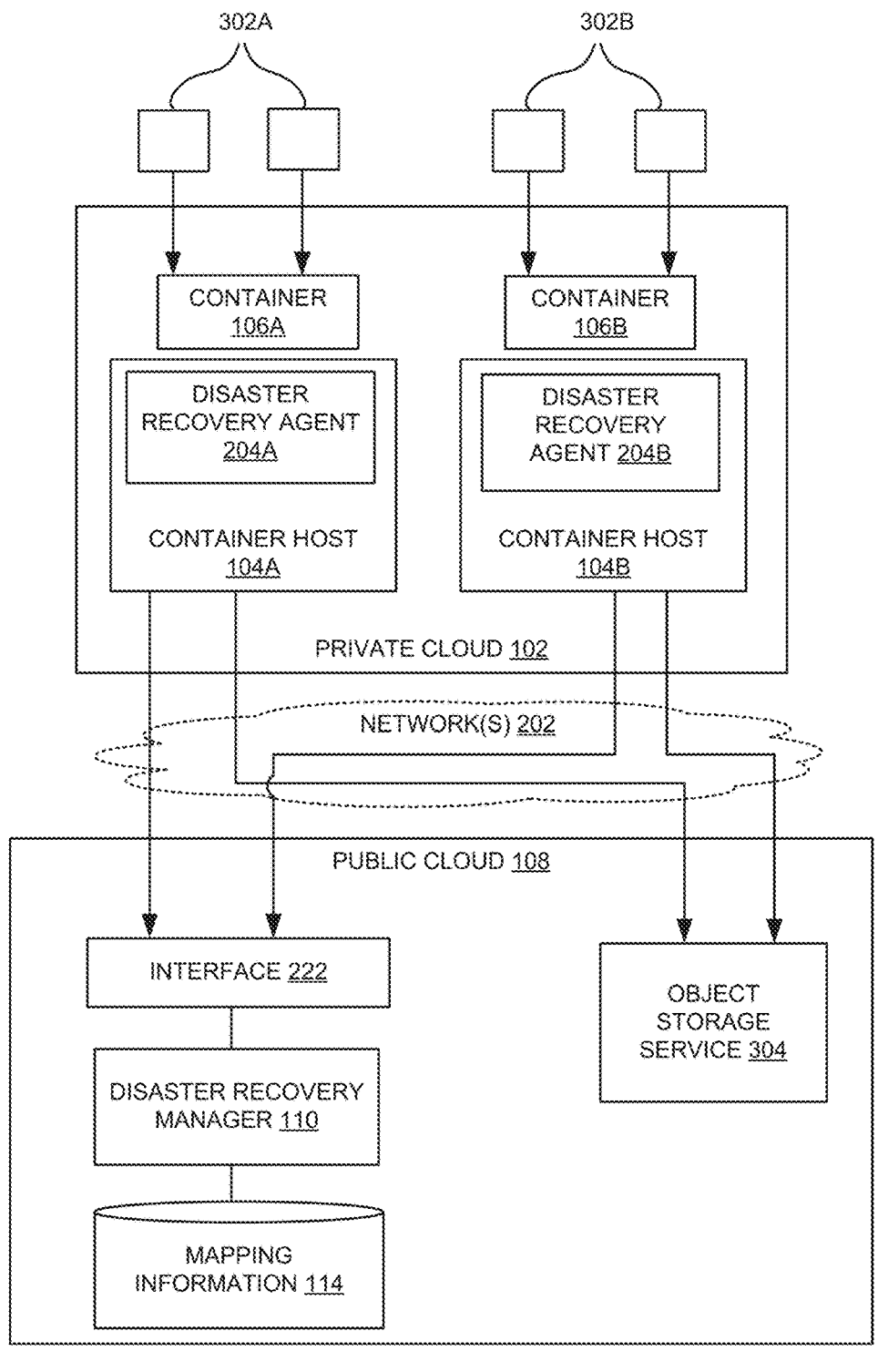
FIG. 3 is a schematic diagram of an example system, depicting synchronization of volume data associated with containers to the public cloud.

FIG. 3 is a block diagram of an example system 300, depicting synchronization of the volume data associated with containers 106A and 106B to public cloud 108. A disaster recovery group may be created in public cloud 108, for instance, using an interface 222 (e.g., SaaS portal). For example, SaaS portal may allow the user to connect to and use cloud-based apps over network 202. Further, containers 106A and 106B running on respective container hosts 104A and 104B may be added to the disaster recovery group. For example, container hosts 104A and 104B may refer to a hardware platform or a virtual machine having compute and storage resources for executing containers 106A and 106B.

Further, disaster recovery agents 204A and 204B residing in respective container hosts 104A and 104B may poll interface 222 to get updated information about containers that are added to the disaster recovery group. Furthermore, disaster recovery agents 204A and 204B may retrieve/get the mapping information 114 (e.g., volume mapping information) of each protected containers 106A and 106B from the information associated with the disaster recovery group. Disaster recovery agents 204A and 204B may create a bucket for each volume mapping of each container 106A and 106B in an object storage service 304 in public cloud 108. Example object storage service 304 may include an Amazon S3 service. For example, object storage service 304 may allocate a storage within public cloud 108 to the enterprise.

The data associated with containers 106A and 106B may be stored to corresponding container mounted volumes 302A and 302B of private cloud 102. Furthermore, disaster recovery agents 204A and 204B may initiate a copy of the files (e.g., the data in container mounted volumes 302A and 302B) to a corresponding bucket in object storage service 304. After initial copy of the files is completed, disaster recovery agents 204A and 204B may request interface 222 to update the volume mapping in mapping information 114. Further, disaster recovery agents 204A and 204B may detect the file changes in container mounted volumes 302A and 302B and periodically update the corresponding buckets in object storage service 304 of public cloud 108.

Figure 4:
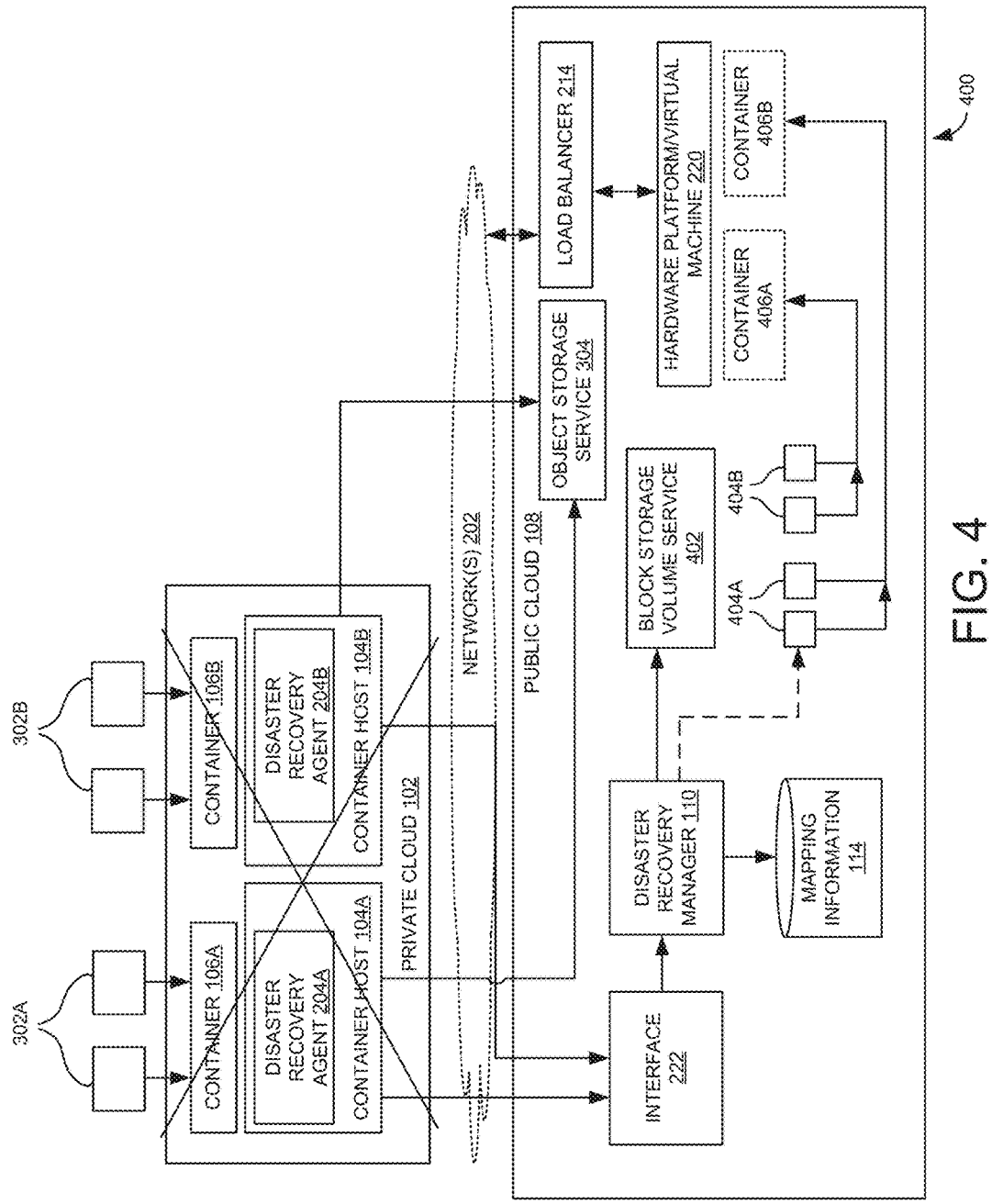
FIG. 4 is a schematic diagram of an example system, depicting a disaster recovery operation to deploy the containers in the public cloud.

FIG. 4 is a schematic diagram of an example system 400, depicting a disaster recovery operation to deploy containers 406A and 406B in public cloud 108. The disaster recovery operation may be performed so that containers 106A and 1066 swap from being hosted by private cloud 102 to being hosted by public cloud 108 (e.g., containers 406A and 406B may correspond to containers 106A and 1066, respectively). During operation, disaster recovery manager 110 may detect heartbeat loss from disaster recovery agents 204A and 204B (as represented by the "X" over private cloud 102 in FIG. 4) and initiate a disaster recovery operation. Further, disaster recovery manager 110 may refer/retrieve mapping information 114 of protected containers 106A and 106B.

For each volume mapping of each container 106A and 106B, disaster recovery manager 110 may create raw block storage volumes 404A and 404B (e.g., Amazon Elastic Block Store (Amazon EBS) volume), for instance, in block storage volume service 402. For each raw block storage volume 404A and 404B, disaster recovery manager 110 may perform the following:

1. Disaster recovery manager 110 may attach raw block storage volumes 404A and 404B to a hardware platform/virtual machine 220 and mount the file system on respective raw block storage volumes 404A and 404B. In one example, hardware platform/virtual machine 220 may be provided by a cloud manager in public cloud 108.
2. Disaster recovery manager 110 may download (e.g., using mapping information 114) the files of the bucket from object storage service 304 to respective mounted raw block storage volumes 404A and 404B.
3. Disaster recovery manager 110 may mount the data in raw block storage volumes 404A and 404B on hardware platform/virtual machine 220 (i.e., on which containers 406A and 406B can be deployed) and detach raw block storage volumes 404A and 404B from hardware platform/virtual machine 220.
4. Disaster recovery manager 110 may update mapping information 114 with a new block storage volume name in hardware platform/virtual machine 220.

After volume mapping for containers 106A and 106B is created, disaster recovery manager 110 may request public cloud 108 for creating containers 406A and 406B with associated container image information and the newly created volume mappings. Further, disaster recovery manager 110 may contact external load balancer 214 to modify the container access to direct traffic to containers 406A and 406B deployed in public cloud 108. After creating containers 406A and 406B in public cloud 108, application workloads running at containers 406A and 406B can take over application workloads of containers 106A and 106B, respectively.

Figure 5:
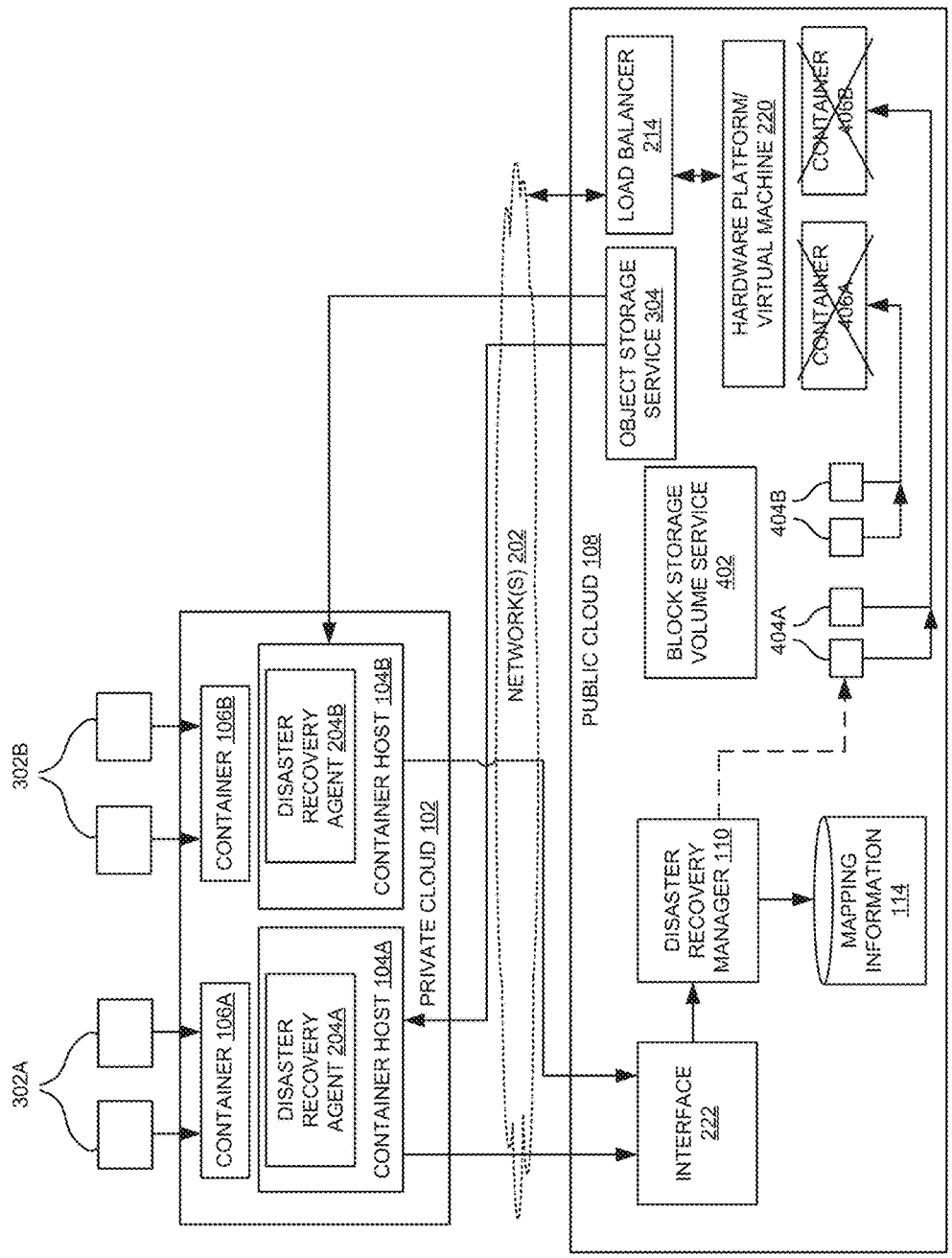
FIG. 5 is a schematic diagram of an example system, depicting a failback/fallback operation to deploy the containers in the private cloud.

FIG. 5 is a block diagram of an example system 500, depicting a failback/fallback operation to deploy containers 106A and 106B in private cloud 102. Example failback/fallback operation may include:

1. For each container 406A and 406B, the fallback operation may be performed as follows:
   a. Disaster recovery manager 110 may refer to updated mapping information 114, attach raw block storage volumes 404A, and 404B to hardware platform/virtual machine 220, and mount raw block storage volumes 404A and 404B to disaster recovery manager 110. In this example, raw block storage volumes 404A and 404B may be shared with disaster recovery manager 110 and running containers 406A and 406B.
   b. Disaster recovery manager 110 may copy latest volume data from raw block storage volumes 404A and 404B and overwrite the corresponding bucket in object storage service 304, based on mapping information 114.
   c. Operations (a) and (b) are repeated for each volume attached to containers 406A and 406B.
2. After volumes are in sync with object storage service 304, disaster recovery manager 110 may notify disaster recovery agents 204A and 204B with the updated mapping information to update containers 106A and 106B in private cloud 102.
3. For each of protected containers 106A and 1066, disaster recovery agents 204A and 204B in private cloud 102 may perform the following:
   a. Disaster recovery agents 204A and 204B may download the buckets mapped to containers 106A and 106B from object storage service 304 and overwrite the contents in the local volume location (e.g., container mounted volumes 302A and 302B).
   b. Disaster recovery agents 204A and 204B may notify disaster recovery manager 110 to shut down running containers 406A and 406B in public cloud 108.
   c. Disaster recovery agents 204A and 204B may contact external load balancer 214 to modify the container access to direct traffic to new containers 106A and 106B deployed in private cloud 102.
4. Disaster recovery agents 204A and 204B may continue to sync the volume data with the buckets in object storage service 304 using mapping information 114.

In the example shown in FIGS. 3-5, disaster recovery manager 110 is shown as a part of public cloud 108, however, disaster recovery manager 110 can also be implemented external to public cloud 108 such that disaster recovery manager 110 can access public cloud 108 via a network.

In one example, the components of private cloud 102 and public cloud 108 may be implemented in hardware, machine-readable instructions or a combination thereof. In one example, each of disaster recovery agent 204, interfaces 116, 118, and 222, and disaster recovery manager 110 can be any combination of hardware and programming to implement the functionalities described herein. In another example, the functionality of the components of private cloud 102 and public cloud 108 may be implemented using technology related to personal computers (PCs), server computers, tablet computers, mobile computers and the like.

System may include computer-readable storage medium comprising (e.g., encoded with) instructions executable by a processor to implement functionalities described herein in relation to FIGS. 1-5. In some examples, the functionalities described herein in relation to instructions to implement functions of components of private cloud 102 and public cloud 108 and any additional instructions described herein in relation to storage medium, may be implemented as engines or modules comprising any combination of hardware and programming to implement the functionalities of the modules or engines. In examples described herein, the processor may include, for example, one processor or multiple processors included in a single computing device or distributed across multiple computing devices.

Figure 6:
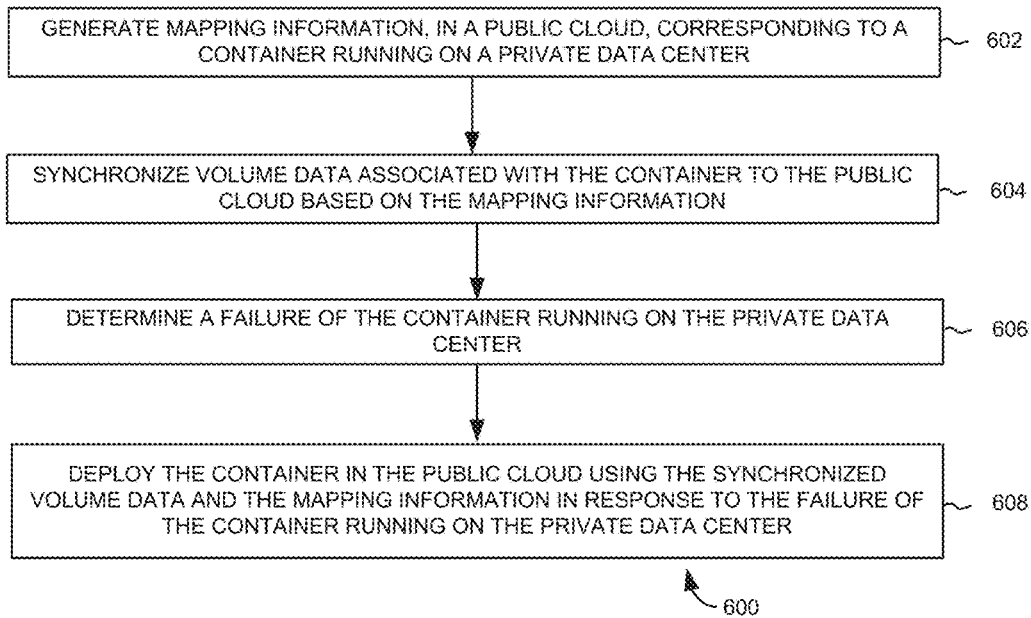
FIG. 6 is a flowchart of an example method for disaster recovery of a container in a hybrid cloud computing system.

FIG. 6 is a flowchart of an example method 600 for disaster recovery of containers in a hybrid cloud computing system. Method 600 may be described below as being executed or performed by a system, for example, system 100

(FIG. 1). In various examples, method 600 may be performed by hardware, software, firmware, or some combination thereof. Other suitable systems and/or computing devices may be used as well. Method 600 may be implemented in the form of executable instructions stored on at least one machine-readable storage medium of the system and executed by at least one processor of the system. Alternatively or in addition, method 600 may be implemented in the form of electronic circuitry (e.g., hardware). In alternate examples of the present disclosure, one or more blocks of method 600 may be executed substantially concurrently or in a different order than shown in FIG. 6. In alternate examples of the present disclosure, method 600 may include more or fewer blocks than are shown in FIG. 6. In some examples, one or more of the blocks of method 600 may, at certain times, be ongoing and/or may repeat.

At 602, mapping information corresponding to a container running on a private data center may be generated in a public cloud by a processor-based disaster recovery manager. Example mapping information may include at least one of information associated with a container image, a location of the container image in the public cloud, a location of the volume data in the public cloud, and a location of the volume data in the private data center.

In one example, a disaster recovery group may be created in the public cloud via an interface of the public cloud. Example interface may include a SaaS portal. Further, the container running on the private data center may be assigned to the disaster recovery group in the public cloud via the interface. Furthermore, the mapping information for the container may be generated in the public cloud corresponding to the disaster recovery group.

At 604, volume data associated with the container may be synchronized to the public cloud based on the mapping information by the disaster recovery manager. In one example, a container image associated with the container running on the private data center may be received and stored to an image store in the public cloud. Further, the volume data associated with the container may be received and stored to a volume store in the public cloud based on the mapping information. Furthermore, changes in the volume data associated with the container may be dynamically updated to the volume store in the public cloud. An example method for synchronizing volume data associated with the container to the public cloud is explained in FIG. 7.

At 606, a failure of the container running on the private data center may be determined by the disaster recovery manager. At 608, the container may be deployed in the public cloud by the disaster recovery manager using the synchronized volume data and the mapping information in response to the failure of the container running on the private data center. In one example, a container image associated with the container may be retrieved from an image store upon detecting the failure. Further, the volume data associated with the container may be retrieved from a volume store based on the mapping information. Furthermore, the container may be deployed on a hardware platform or a virtual machine in the public cloud using the retrieved container image and the retrieved volume data. An example method for deploying container in the public cloud is explained in FIG. 8.

Further, a network routing entry may be updated in a router in the private data center to redirect traffic to the container deployed in the public cloud. Furthermore, the mapping information corresponding to the container in the public cloud may be updated.

In another example, when the private data center comes online after failure, a failback operation may be initiated to deploy the container from the public cloud to the private data center. In one example, a failback request may be received via a disaster recovery agent in the private data center. Further, the failback request may be verified from the private data center. Furthermore, deploying of the container in the private data center may be enabled based on a container image and the mapping information upon successful verification. Then, the volume data associated with the container may be copied from the public cloud to the private data center. In addition, updating of a network routing entry may be enabled in a router to redirect traffic to the container deployed in the private data center. An example method for failback operation is explained in FIG. 9.

Figure 7:
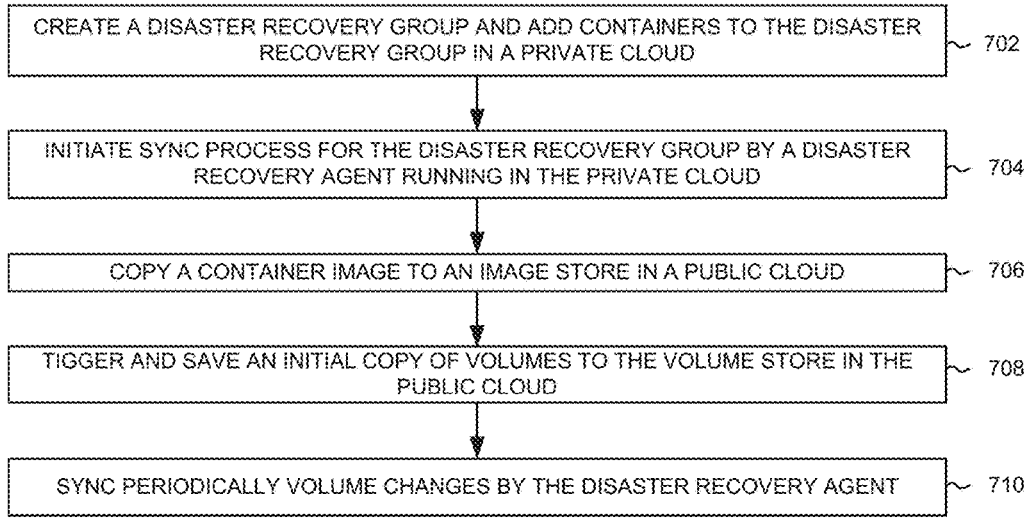
FIG. 7 is a flowchart of an example method for synchronizing volume data associated with the container to the public cloud.

FIG. 7 is a flowchart of an example method 700 for synchronizing volume data associated with the containers to the public cloud. At 702, a disaster recovery group may be created, and the containers may be added to the disaster recovery group in the private cloud. At 704, a sync process may be initiated for the disaster recovery group by a disaster recovery agent running in the private cloud. At 706, a container image of each container added to the disaster recovery group may be copied to an image store in the public cloud.

At 708, an initial copy of volumes may be triggered and saved to the volume store in the public cloud. At 710, volume changes associated with the containers in the disaster recovery group may be periodically synchronized to the public cloud by the disaster recovery agent.

Figure 8:
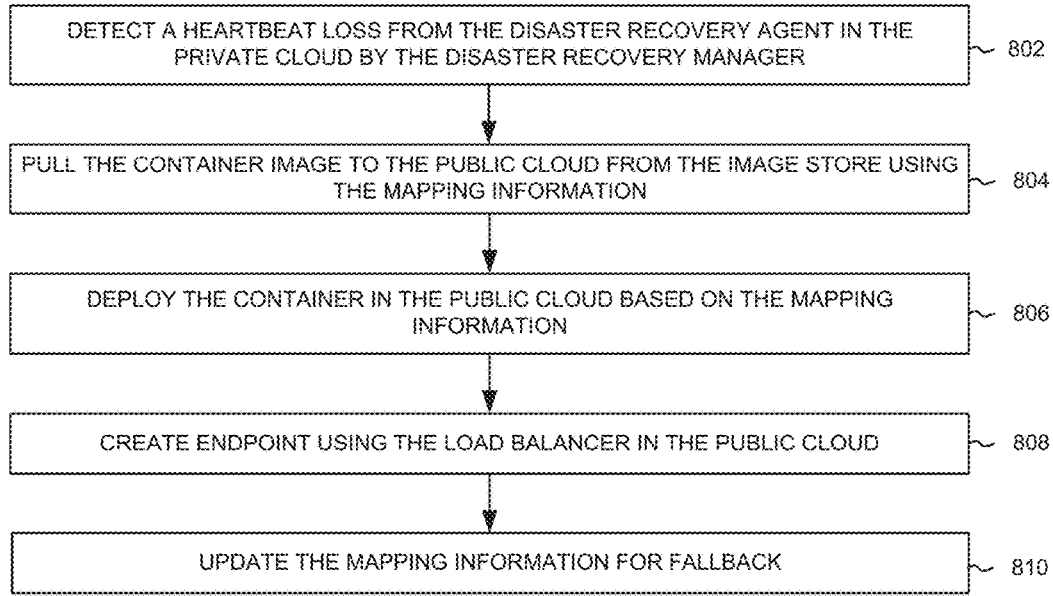
FIG. 8 is a flowchart of an example method for deploying the container in the public cloud.

FIG. 8 is a flowchart of an example method 800 for deploying container in the public cloud. At 802, a heartbeat loss from the disaster recovery agent in the private cloud may be detected by the disaster recovery manager. At 804, the container image may be retrieved/pulled to the public cloud from the image store using the mapping information. At 806, the container may be deployed in the public cloud based on the mapping information. At 808, an endpoint to the container deployed in the public cloud may be created using the load balancer in the public cloud. At 810, the mapping information may be updated, which can be used during fallback operation.

Figure 9:
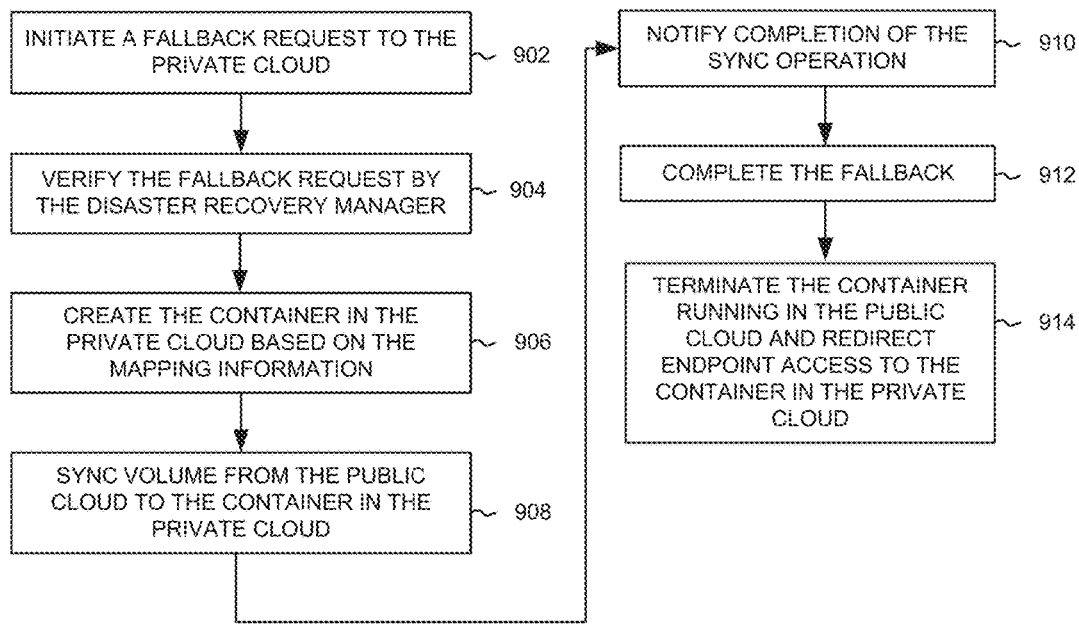
FIG. 9 is a flowchart of an example method for failback/fallback operation.

FIG. 9 is a flowchart of an example method 900 for failback/fallback operation. At 902, a fallback request to the private cloud may be initiated. At 904, the fallback request may be verified by the disaster recovery manager. At 906, the container may be created in the private cloud based on the mapping information. At 908, the volume data from the public cloud may be synchronized to the container in the private cloud. At 910, completion of the synchronization operation may be notified. At 912, the fallback of the container to the private cloud may be completed. At 914, the container running in the public cloud may be terminated and endpoint access may be redirected to the container in the private cloud to realize public cloud service expense savings.

Figure 10:
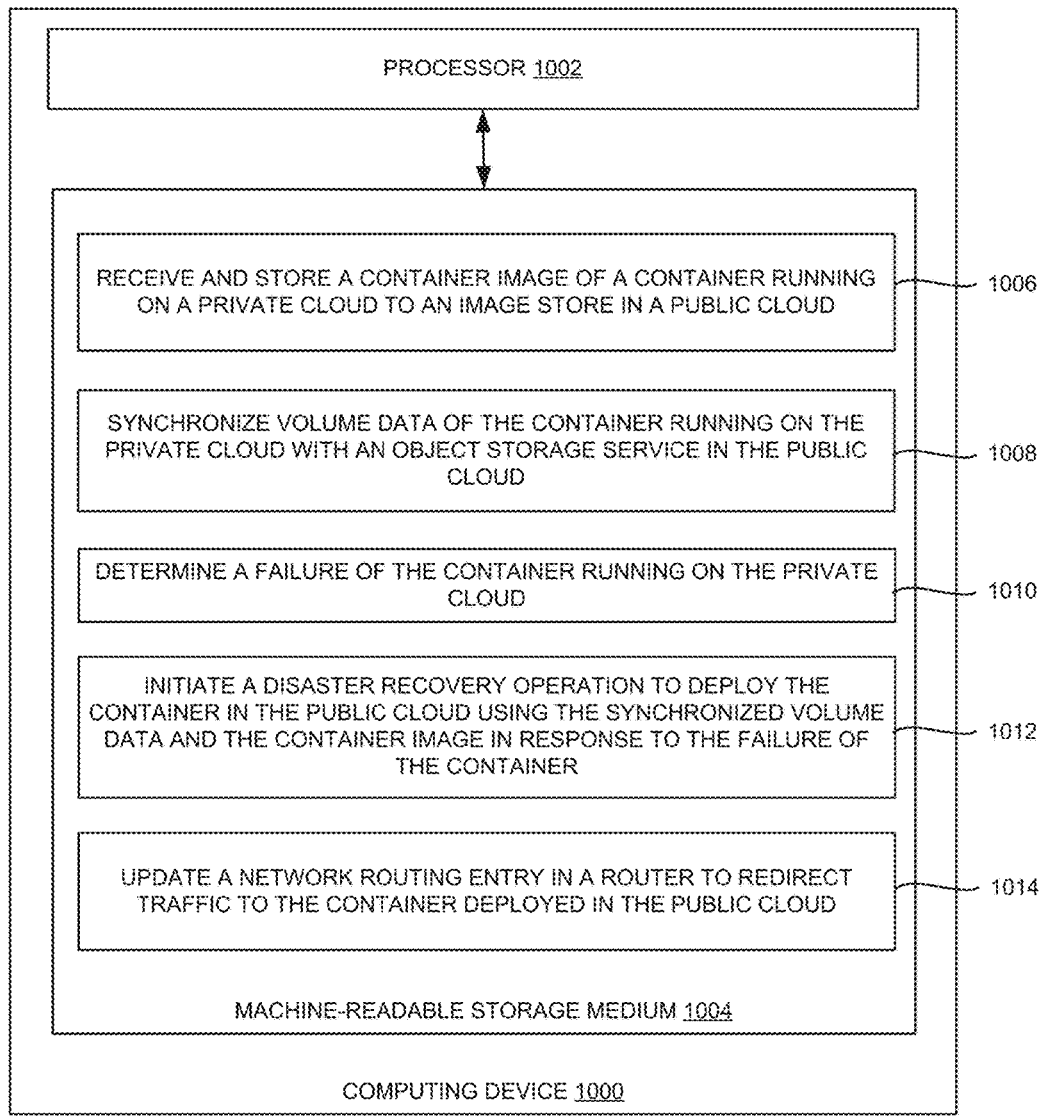
FIG. 10 is a block diagram of an example computing device, for performing disaster recovery of containers in a hybrid cloud computing system.

FIG. 10 is a block diagram of an example computing device 1000, for performing disaster recovery of containers in a hybrid cloud computing system. Computing device 1000 can be implemented as a part of a public cloud or as an external device to the public cloud. In the example of FIG. 10, a computing device 1000 may include a processor 1002 and a machine-readable storage medium 1004. Although the following descriptions refer to a single processor and a single machine-readable storage medium, the descriptions may also apply to a system with multiple processors and multiple machine-readable storage mediums.

In such examples, the instructions may be distributed (e.g., stored) across multiple machine-readable storage mediums and the instructions may be distributed (e.g., executed by) across multiple processors.

Processor 1002 may be one or more central processing units (CPUs), microprocessors, and/or other hardware devices suitable for retrieval and execution of instructions stored in machine-readable storage medium 1004. In the particular example shown in FIG. 10, processor 1002 may fetch, decode, and execute instructions 1006-1014 to perform the disaster recovery operations.

As an alternative or in addition to retrieving and executing instructions, processor 1002 may include one or more electronic circuits comprising a number of electronic components for performing the functionality of one or more of the instructions in machine-readable storage medium 1004. With respect to the executable instruction representations (e.g., boxes) described and shown herein, it should be understood that part or all of the executable instructions and/or electronic circuits included within one box may, in alternate examples, be included in a different box shown in the figures or in a different box not shown.

Machine-readable storage medium 1004 may be any electronic, magnetic, optical, or other physical storage device that stores executable instructions. Thus, machine-readable storage medium 1004 may be, for example, Random Access Memory (RAM), an Electrically-Erasable Programmable Read-Only Memory (EEPROM), a storage drive, an optical disc, and the like. Machine-readable storage medium 1004 may be disposed within computing device 1000, as shown in FIG. 10. In this situation, the executable instructions may be "installed" on the computing device 1000. Alternatively, machine-readable storage medium 1004 may be a portable, external or remote storage medium, for example, that allows computing device 1000 to download the instructions from the portable/external/remote storage medium.

Referring to FIG. 10, instructions 1006 when executed by processor 1002, may cause processor 1002 to receive and store a container image of a container running on a private cloud to an image store in a public cloud. Instructions 1008 when executed by processor 1002, may cause processor 1002 to synchronize volume data of the container running on the private cloud with an object storage service in the public cloud.

Instructions 1010 when executed by processor 1002, may cause processor 1002 to determine a failure of the container running on the private cloud. Instructions 1012 when executed by processor 1002, may cause processor 1002 to initiate a disaster recovery operation to deploy the container in the public cloud using the synchronized volume data and the container image in response to the failure of the container running on the private cloud.

In one example, the container image associated with the container may be retrieved from the image store upon detecting the failure. Further, a raw block storage volume may be created, and the raw block storage volume may be mounted to a hardware platform or a virtual machine in the public cloud. Furthermore, the volume data associated with the container may be retrieved from the object storage service and the retrieved volume data may be stored to the mounted raw block storage volume. In addition, the container may be deployed on the hardware platform or the virtual machine in the public cloud using the retrieved container image and the retrieved volume data.

Instructions 1012 when executed by processor 1002, may cause processor 1002 to update a network routing entry in a router to redirect traffic to the container deployed in the public cloud.

In other examples, machine-readable storage medium 1004 may further include instructions to receive a failback request via a disaster recovery agent in the private cloud, verify the failback request from the private cloud, transmit the volume data associated with the container from the public cloud to the private cloud upon successful verification, and terminate the container running on the public cloud upon successfully transmitting the volume data.

Machine-readable storage medium 1004 may further include instructions to maintain mapping information corresponding to the container in the public cloud. In some examples, the container may be deployed in the public cloud by retrieving the volume data and the container image associated with the container based on the mapping information. Examples described in FIGS. 1-10 may include a colocation center on the public cloud. For example, the colocation center may be a data center facility in which an enterprise/business can rent space for servers and other computing hardware. Since the containers may be initiated/deployed on the public cloud when the disaster occurs, and the public cloud offers to purchase the servers and/or the computing hardware for use on an as-needed basis, cost for maintenance of colocation center can be minimal. Also, examples described herein may apply to other examples of contexts, such as virtual machines having a corresponding guest operating system.

It may be noted that the above-described examples of the present solution are for the purpose of illustration only. Although the solution has been described in conjunction with a specific example thereof, numerous modifications may be possible without materially departing from the teachings and advantages of the subject matter described herein. Other substitutions, modifications and changes may be made without departing from the spirit of the present solution. All of the features disclosed in this specification (including any accompanying claims, abstract and drawings), and/or all of the steps of any method or process so disclosed, may be combined in any combination, except combinations where at least some of such features and/or steps are mutually exclusive.

The terms "include," "have," and variations thereof, as used herein, have the same meaning as the term "comprise" or appropriate variation thereof. Furthermore, the term "based on", as used herein, means "based at least in part on." Thus, a feature that is described as based on some stimulus can be based on the stimulus or a combination of stimuli including the stimulus.

The present description has been shown and described with reference to the foregoing examples. It is understood, however, that other forms, details, and examples can be made without departing from the spirit and scope of the present subject matter that is defined in the following claims.

The invention claimed is:

1. A system comprising:
a first interface;
a second interface; and
a disaster recovery manager to
store mapping information corresponding to a container in a storage repository via the first interface, wherein the container runs on a host computer in a private cloud;

synchronize volume data associated with the container to a public cloud based on the mapping information via the second interface;

determine a failure of the container running on the private cloud; and initiate a disaster recovery operation to deploy the container in the public cloud using the synchronized volume data and the mapping information in response to determining the failure of the container.

2. The system of claim 1, wherein the disaster recovery manager is to:

call an external load balancer in the public cloud to create a network routing entry to direct traffic to the container deployed in the public cloud; and update the mapping information corresponding to the container upon redirecting the traffic to the container deployed in the public cloud.

3. The system of claim 1, further comprises a third interface in the public cloud to:

create a disaster recovery group in the public cloud; and assign the container running on the private cloud to the disaster recovery group, wherein the mapping information for the container, corresponding to the disaster recovery group, is maintained in the public cloud.

4. The system of claim 1, wherein the disaster recovery manager is to synchronize the volume data associated with the container to the public cloud by:

receiving and storing a container image associated with the container to an image store in the public cloud based on the mapping information;

receiving and storing the volume data associated with the container to a volume store in the public cloud based on the mapping information; and dynamically updating changes in the volume data associated with the container to the volume store.

5. The system of claim 1, wherein the disaster recovery manager is to initiate the disaster recovery operation by:

retrieving a container image associated with the container from an image store in the public cloud upon detecting the failure based on the mapping information;

retrieving the volume data associated with the container from a volume store in the public cloud based on the mapping information; and deploying the container on a hardware platform or a virtual machine in the public cloud using the retrieved container image and the retrieved volume data.

6. The system of claim 5, wherein the disaster recovery manager is to deploy the container on the hardware platform or the virtual machine in the public cloud by:

retrieving mapping information from the storage repository;

creating a raw block storage volume and mounting the raw block storage volume to the hardware platform or the virtual machine in the public cloud;

retrieving the volume data associated with the container from the volume store based on the mapping information and storing the retrieved volume data to the mounted raw block storage volume; and deploying the container on the hardware platform or the virtual machine in the public cloud using the retrieved container image and the retrieved volume data in the mounted raw block storage volume.

7. The system of claim 1, wherein the disaster recovery manager is to determine the failure of the container running on the private cloud by detecting a heartbeat loss from a disaster recovery agent residing in the host computer.

8. The system of claim 1, wherein the mapping information comprises at least one of information associated with a container image, a location of the container image in the public cloud, a location of the volume data in the public cloud, and a location of the volume data in the private cloud.

9. A method comprising: generating, by a processor-based disaster recovery manager, mapping information, in a public cloud, corresponding to a container running on a private data center; synchronizing, by the processor-based disaster recovery manager, volume data associated with the container to the public cloud based on the mapping information; determining, by the processor-based disaster recovery manager, a failure of the container running on the private data center; and deploying, by the processor-based disaster recovery manager, the container in the public cloud using the synchronized volume data and the mapping information in response to the failure of the container running on the private data center.

10. The method of claim 9, further comprising:

updating a network routing entry in a router in the private data center to redirect traffic to the container deployed in the public cloud; and updating the mapping information corresponding to the container in the public cloud.

11. The method of claim 9, wherein generating the mapping information comprises:

creating, via an interface of the public cloud, a disaster recovery group in the public cloud;

assigning, via the interface, the container running on the private data center to the disaster recovery group in the public cloud; and generating the mapping information for the container in the public cloud corresponding to the disaster recovery group.

12. The method of claim 9, wherein synchronizing volume data associated with the container to the public cloud comprises:

receiving and storing a container image associated with the container to an image store in the public cloud;

receiving and storing the volume data associated with the container to a volume store in the public cloud based on the mapping information; and dynamically updating changes in the volume data associated with the container to the volume store in the public cloud.

13. The method of claim 9, wherein deploying the container in the public cloud comprises:

retrieving a container image associated with the container from an image store upon detecting the failure;

retrieving the volume data associated with the container from a volume store based on the mapping information; and deploying the container on a hardware platform or a virtual machine in the public cloud using the retrieved container image and the retrieved volume data.

14. The method of claim 9, further comprising initiating a failback operation to deploy the container from the public cloud to the private data center, the failback operation comprising:

receiving a failback request via a disaster recovery agent in the private data center;

verifying the failback request from the private data center;

enabling to deploy the container in the private data center based on a container image and the mapping information upon successful verification;

copying the volume data associated with the container from the public cloud to the private data center; and enabling to update a network routing entry in a router to redirect traffic to the container deployed in the private data center.

15. The method of claim 9, wherein the mapping information comprises at least one of information associated with a container image, a location of the container image in the public cloud, a location of the volume data in the public cloud, and a location of the volume data in the private data center.

16. A non-transitory machine-readable storage medium encoded with instructions that, when executed by a processor, cause the processor to:

receive and store a container image of a container running on a private cloud to an image store in a public cloud;

synchronize volume data of the container running on the private cloud with an object storage service in the public cloud;

determine a failure of the container running on the private cloud;

initiate a disaster recovery operation to deploy the container in the public cloud using the synchronized volume data and the container image in response to the failure of the container running on the private cloud; and update a network routing entry in a router to redirect traffic to the container deployed in the public cloud.

17. The non-transitory machine-readable storage medium of claim 16, wherein initiating the disaster recovery operation comprises:

retrieving the container image associated with the container from the image store upon detecting the failure;

creating a raw block storage volume and mounting the raw block storage volume to a hardware platform or a virtual machine in the public cloud;

retrieving the volume data associated with the container from the object storage service and storing the retrieved volume data to the mounted raw block storage volume; and deploying the container on the hardware platform or the virtual machine in the public cloud using the retrieved container image and the retrieved volume data.

18. The non-transitory machine-readable storage medium of claim 16, further comprising instructions to:

receive a failback request via a disaster recovery agent in the private cloud;

verify the failback request from the private cloud;

transmit the volume data associated with the container from the public cloud to the private cloud upon successful verification; and terminate the container running on the public cloud upon successfully transmitting the volume data.

19. The non-transitory machine-readable storage medium of claim 16, comprising instructions to:

maintain mapping information corresponding to the container in the public cloud, wherein the mapping information comprises at least one of information associated with the container image, a location of the container image in the public cloud, a location of the volume data in the public cloud, and a location of the volume data in the private cloud.

20. The non-transitory machine-readable storage medium of claim 17, wherein the container is deployed in the public cloud by retrieving the volume data and the container image associated with the container based on the mapping information.

* * * * *